United States Patent [19]
Skoli et al.

[11] 3,771,289
[45] Nov. 13, 1973

[54] COLLECTION DEVICE FOR DRYER EXHAUST GASES

[76] Inventors: Sigmund P. Skoli; Harry G. Mojonnier; Chester J. Witt; Walter A. Seyfarth; Victor H. Ross, all of 4601 W. Ohio St., Chicago, Ill.

[22] Filed: June 9, 1969

[21] Appl. No.: 834,598

Related U.S. Application Data

[63] Continuation of Ser. No. 642,450, May 31, 1967, abandoned.

[52] U.S. Cl............... 55/222, 49/137, 55/223, 55/233, 55/238, 55/242, 55/258, 55/260, 55/269, 55/274, 55/279, 55/315, 55/345, 55/385, 55/391, 55/417, 55/439, 55/444, 55/466, 99/56, 159/4 R, 261/79 A, 261/100, 261/111, 261/112, 261/116, 261/153

[51] Int. Cl............................................. B01d 47/06

[58] Field of Search................. 261/115, 79 A, 100, 261/111, 112, 116, 153; 55/222, 223, 233, 238, 242, 258, 260, 269, 274, 279, 315, 345, 385, 391, 417, 439, 444, 466; 99/56; 159/4 R; 49/137

[56] References Cited
UNITED STATES PATENTS

| | | |
|---|---|---|
| 2,354,675 | 8/1944 | Fisher.............................. 55/238 X |
| 2,887,390 | 5/1959 | Coulter et al..................... 55/238 X |
| 2,980,179 | 4/1961 | Campbell, Jr...................... 159/4 A |
| 3,102,035 | 8/1963 | Sanna.................................. 159/4 X |
| 3,131,041 | 4/1964 | Gupner....................... 261/DIG. 54 |
| 3,189,018 | 6/1965 | Sass et al......................... 165/155 X |
| 1,874,903 | 8/1932 | Comway........................... 49/137 X |
| 2,133,904 | 10/1938 | Reichhold et al.............. 261/112 X |
| 2,353,912 | 7/1944 | Lindsey............................. 159/13 A |
| 2,523,529 | 9/1950 | Zwickl................................. 55/428 |
| 2,590,905 | 4/1932 | Tomlinson et al................. 159/4 A |
| 2,599,067 | 6/1952 | Otto.................................... 159/3 X |
| 2,618,365 | 11/1952 | Seagren........................... 49/137 X |
| 2,640,532 | 6/1953 | Bowen et al....................... 159/4 A |
| 2,645,560 | 7/1953 | Otto................................. 55/257 X |
| 2,651,269 | 9/1953 | French............................... 34/57 X |
| 2,783,544 | 3/1957 | Bachmann et al................ 34/57 X |

FOREIGN PATENTS OR APPLICATIONS

| | | |
|---|---|---|
| 21,850 | 3/1936 | Australia............................ 165/155 |

Primary Examiner—Dennis E. Talbert, Jr.
Attorney—Olson, Trexler, Wolters & Bushnell

[57] ABSTRACT

Wet-process apparatus for removing suspended particles from dryer exhaust gases including a spray device delivering atomized liquid into the gas stream and a vessel with cooled or wetted surfaces for collecting liquid from the gases together with the particles trapped by the liquid.

4 Claims, 6 Drawing Figures

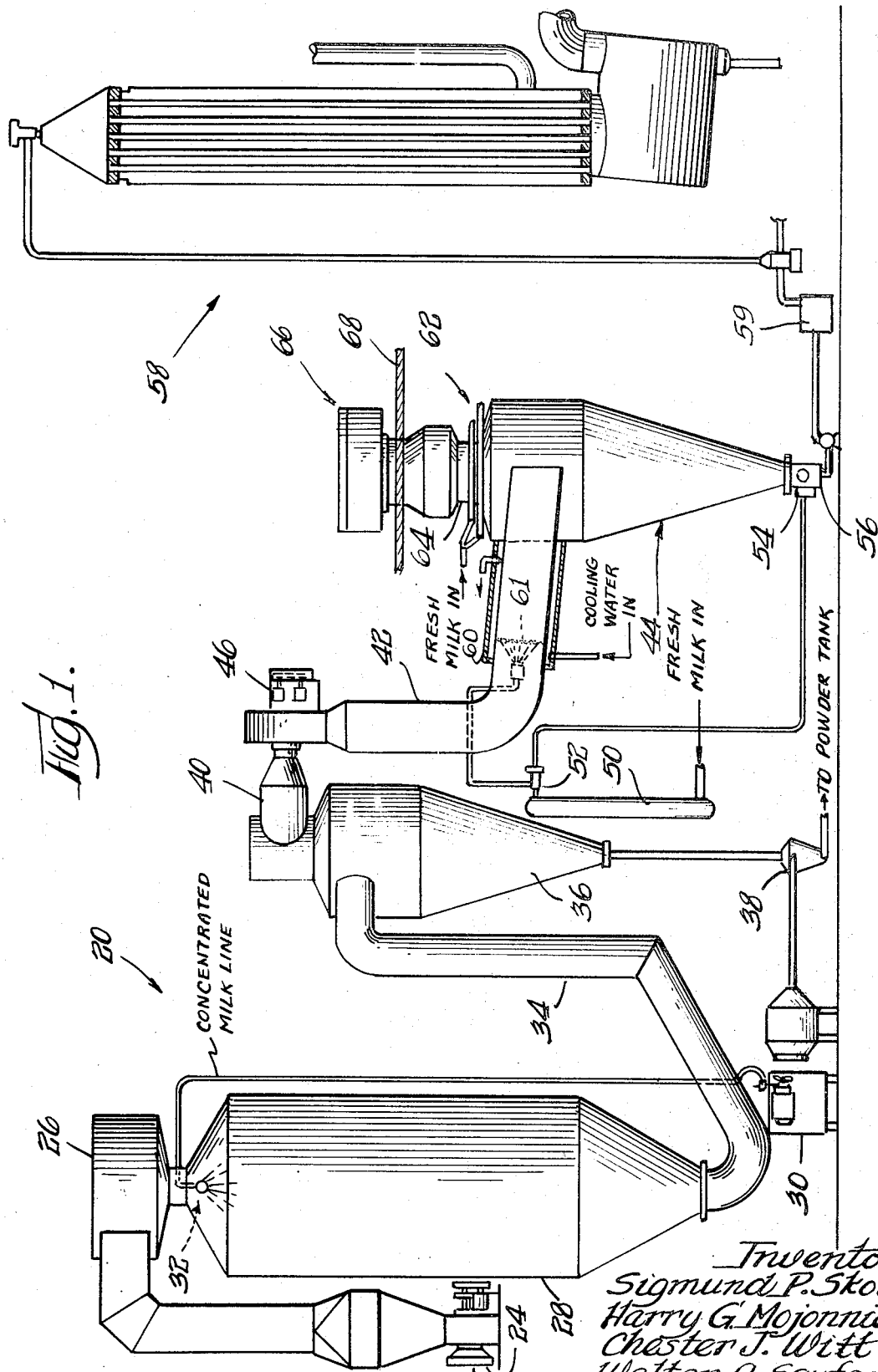

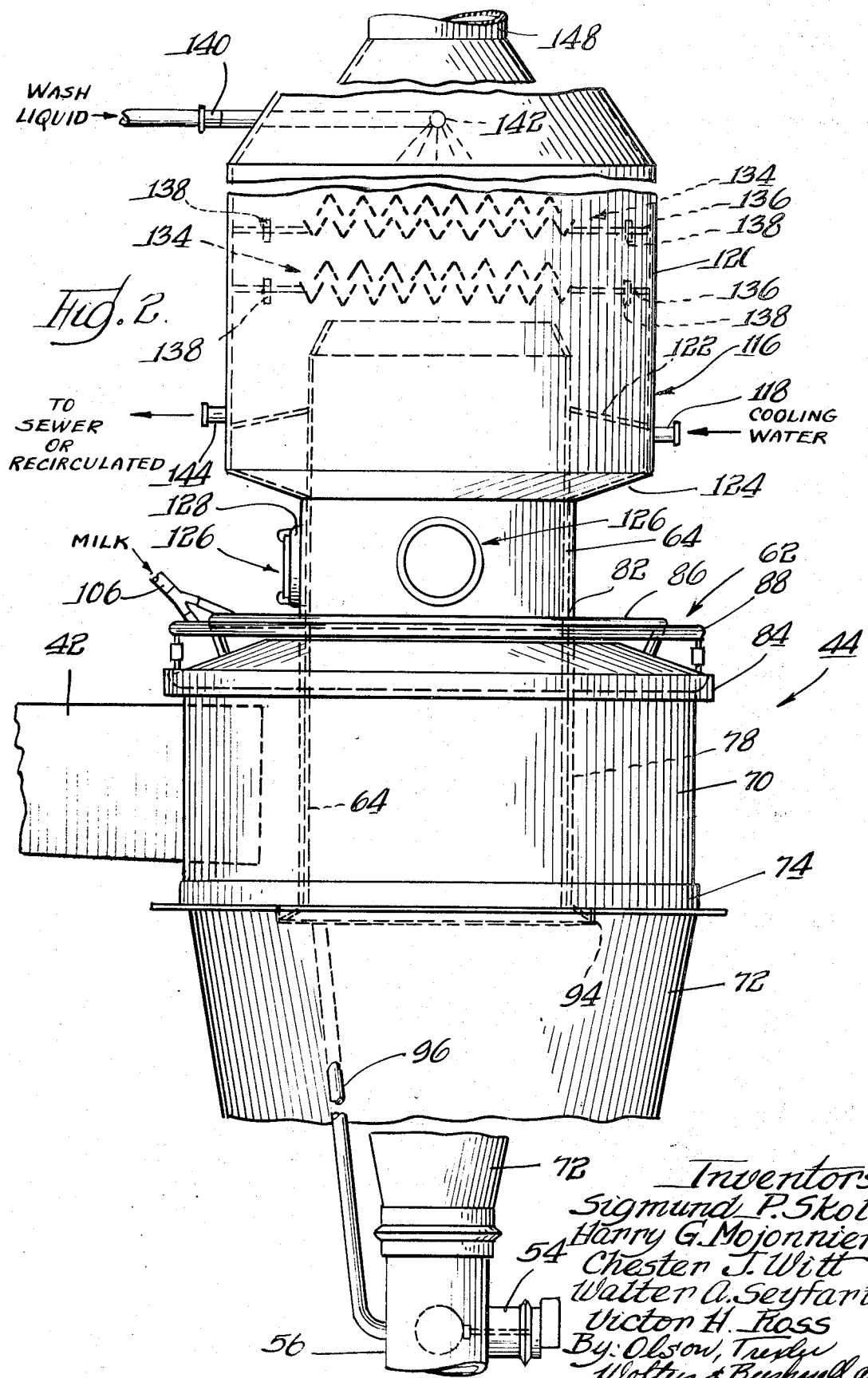

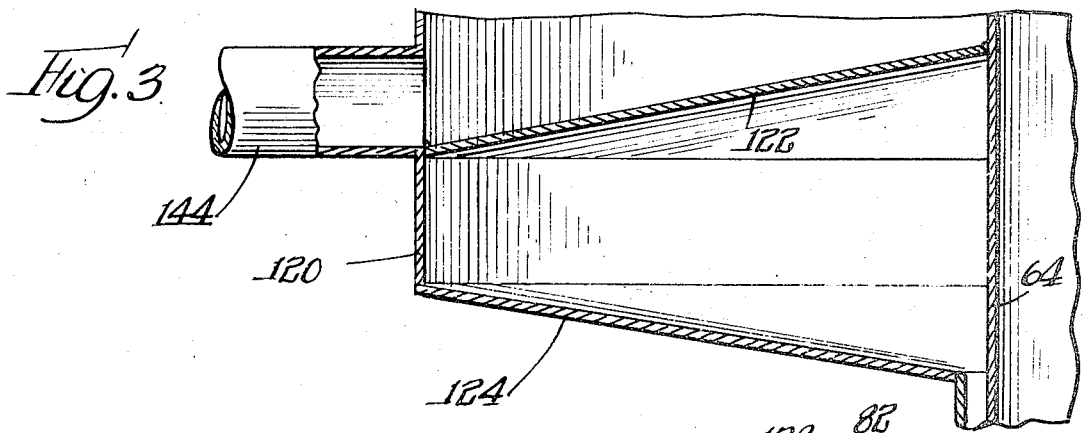
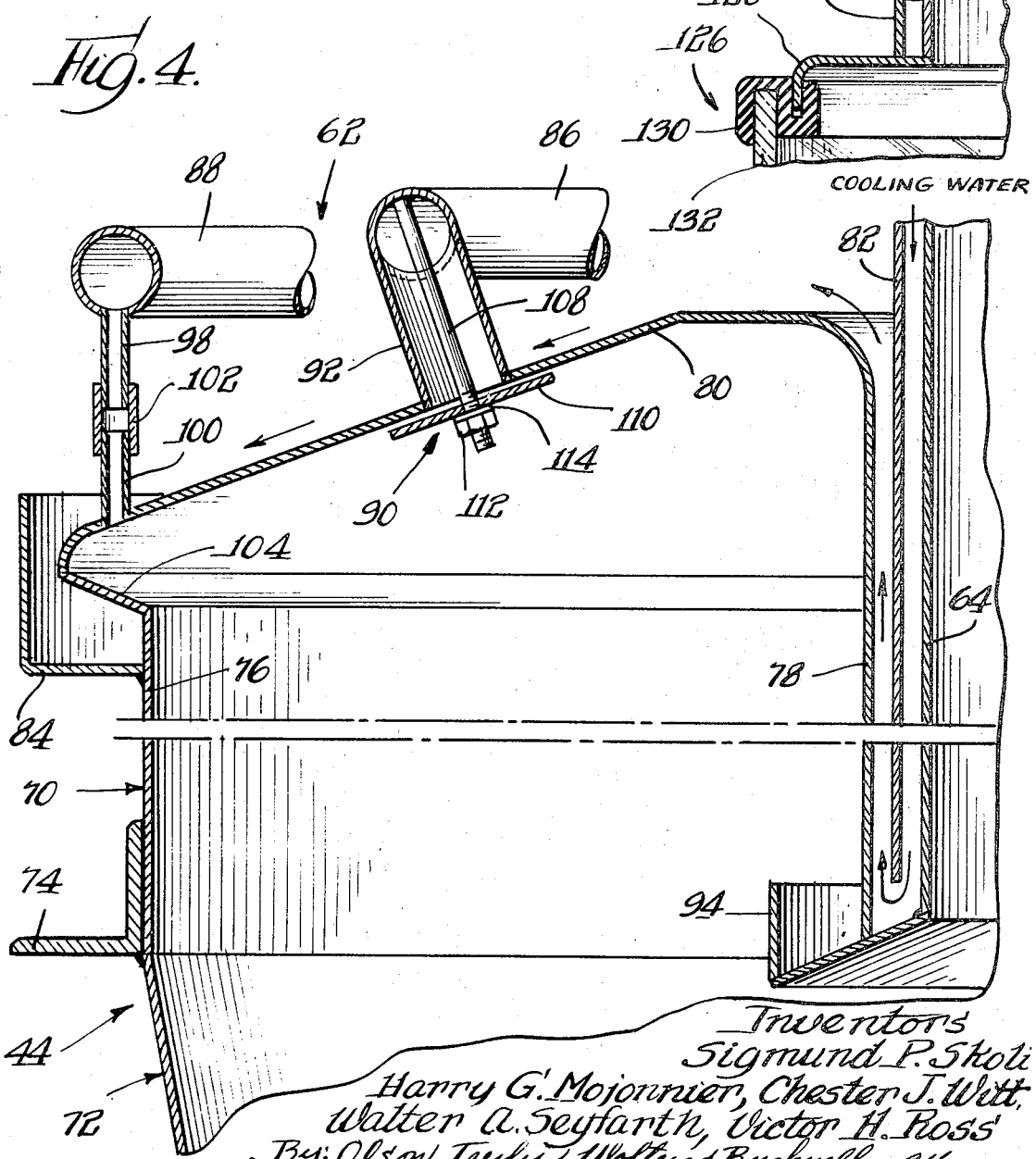

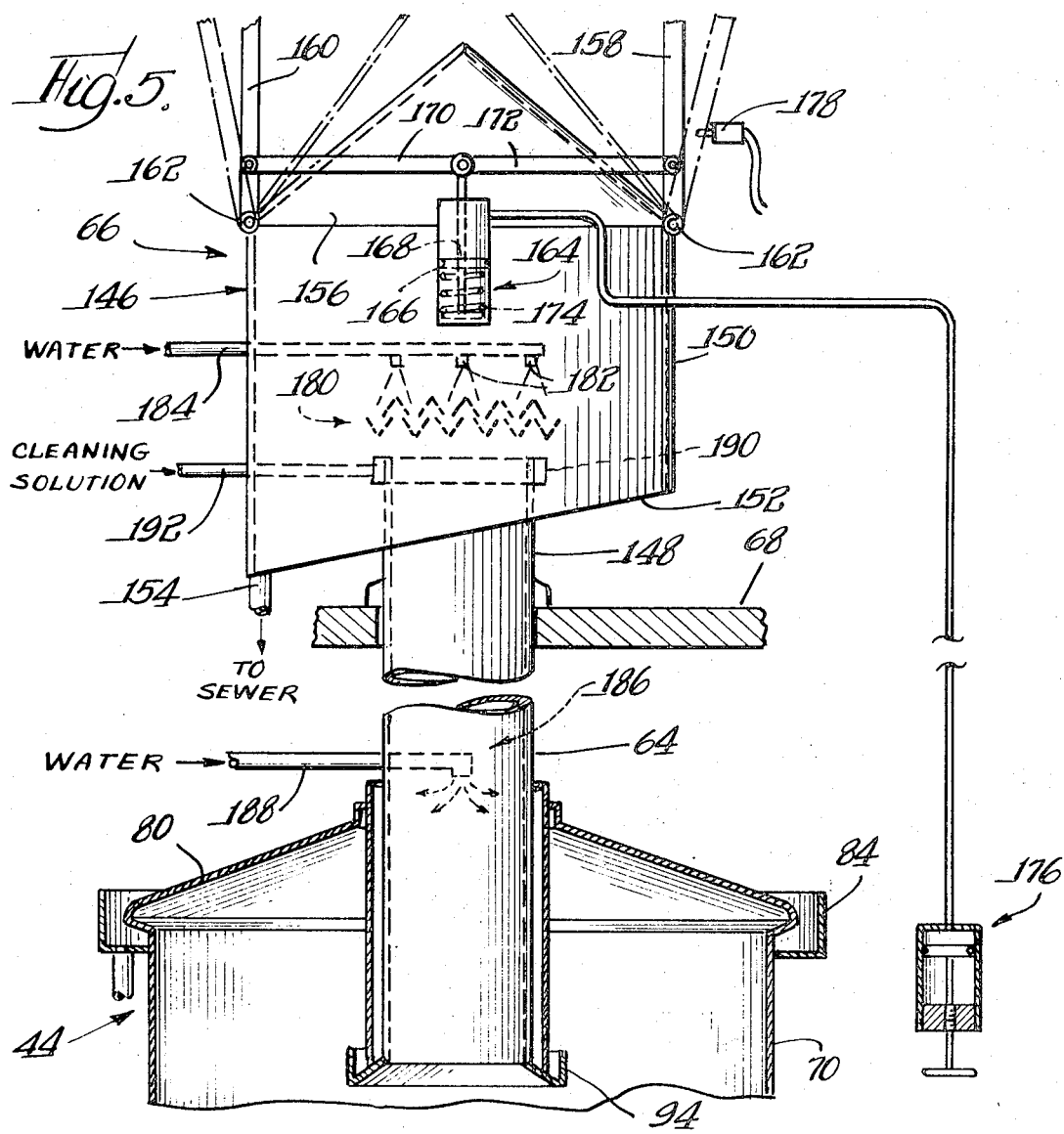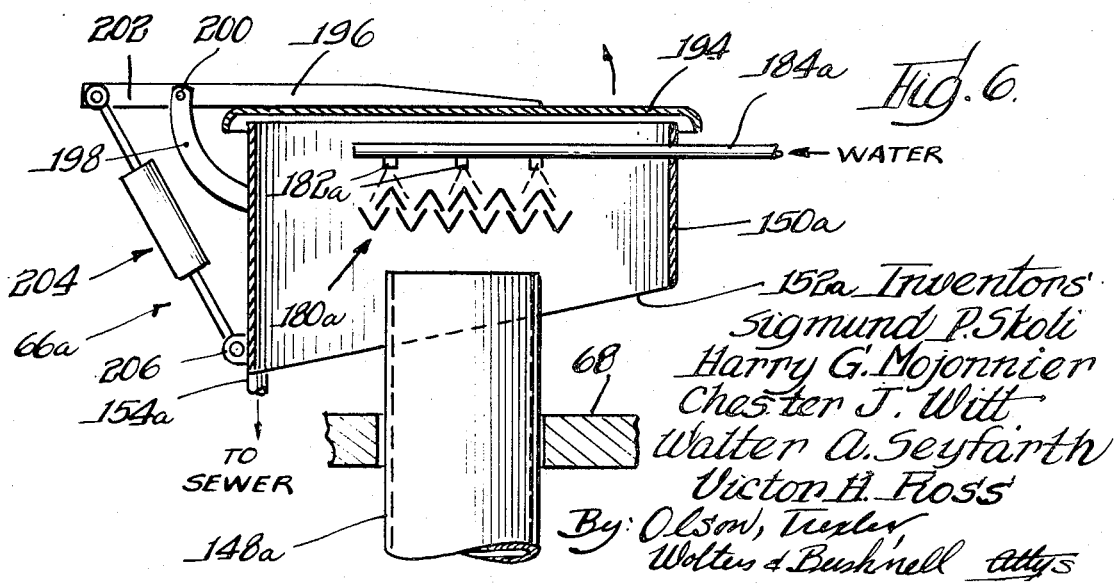

COLLECTION DEVICE FOR DRYER EXHAUST GASES

This application is a continuation of application Ser. No. 642,450, filed May 31, 1967, now abandoned.

This invention relates generally to the art of drying liquid products to obtain the dissolved or dispersed solids and more particularly to the separation of finely divided particles from a gas stream such as the exhaust from a milk dryer.

The desirability of separating suspended particles from dryer outlet gases become readily apparent when operating economics, sanitation or air pollution is considered; and in the past, cyclone separators or bag filters have been ordinarily employed. Conventional cyclone separators do not achieve more than a moderate degree of separation and are ineffective at removing finely divided particles. Bag filters, on the other hand, while capable of more nearly complete separation, even of finely divided solids, are beset with the substantial expense of bag replacement. Bag filters also exhibit declining efficiency as the bags fill and additionally present a potential source of microbiological contamination.

Therefore, a general object of the present invention is to provide new and improved apparatus for collecting suspended particles from a gas stream.

Another object of the invention is to provide such apparatus that is particularly characterized by its economy and efficiency of operation.

Still another object of the invention is to provide such apparatus that can be put through a clean-up and sanitizing cycle.

Even in the most efficient separator operation, certain minute quantities of suspended particles escape to the exhaust stack; and in time, these particles build up a deposit in the stack area. When the deposits constitute nutrient material, an unsanitary condition can develop. The unsightliness of such deposits is also undesirable.

Accordingly, a further object of the present invention is to provide an auxiliary stack collection device for use with separator apparatus.

The foregoing and other objects and features of the invention will become more apparent from a consideration of the following descriptions.

In the drawings:

FIG. 1 is a schematic view of a dryer circuit incorporating a separator in the exhaust line in compliance with the present invention;

FIG. 2 is an enlarged, side elevational view of the separator used in the circuit of FIG. 1;

FIG. 3 is a fragmentary, further enlarged, sectional view showing the construction of the cooling arrangement for the flue employed in the separator of FIG. 2;

FIG. 4 is a fragmentary, further enlarged, sectional view showing the means for supplying cooling liquid to the collecting surfaces of the separator of FIG. 2;

FIG. 5 is a side elevational view on an enlarged scale of one form of stack collection device for use with the separator of FIG. 2; and FIG. 6 is a side elevational view showing a modified stack collection device.

One important use of the present invention is in the manufacture of powdered milk products; and hereinafter, such art will be used for purposes of explanation and illustration without intending to limit the applications and uses of the invention in any way. It is recognized that the invention also has utility in the manufacture of dried blood, foam dried products, and dewatered botanicals and pharmaceuticals.

Referring to FIG. 1, a dryer circuit indicated generally by the reference numeral 20 includes a gas furnace and blower unit 22 which draws ambient temperature air through a filtered inlet 24 and which delivers heated air under pressure to a plenum 26 for drying purposes, plenum 26 opening into a precipitation chamber 28. Evaporated milk to be reduced to powder is pumped under pressure from a supply tank 30 to a sprayer unit 32 that is situated in the upper end of precipitation chamber 28. A pipe 34 communicates the lower end of precipitation chamber 28 with a cyclone separator 36 which serves as a primary collector for the powdered milk. This latter product is withdrawn from the separator 36 and passed to a redryer 38 before delivery to a powder tank for packaging. Exhaust air duct 40 leading from cyclone separator 36 opens into a pipe or conduit 42, conduit 42 opening, in turn, into a cyclone separator vessel or collector 44 that is arranged in compliance with the principles of the present invention. If desired, a secondary fan or blower 46 may be employed in accelerating the flow of gases from separator 36 to collector 44.

In specific accord with the features of the present invention, spray means 48 are mounted in the conduit 42 for introducing fresh whole milk, skim milk or the like into the flow of gases passing to the separator vessel 44. Advantageously, this liquid milk enters a vapor line heater 50 from whence it is passed to the spray unit 48. A valve 52 is interposed between heater 50 and spray unit 48, and this valve may be controlled by a level responsive device 54 located in a sump 56 optionally provided at the bottom of collector vessel 44. Having been warmed by contact with the exhaust gases in conduit 42 and vessel 44, the liquid milk passing from the sump 56 is economically employed as the infeed to evaporator apparatus 58, desirably being passed to a balance tank 59 before entering the evaporator apparatus itself. In accord with the present invention, the conduit 42 has a chilled wall section adjacent the spray unit 48, provided for example by a water jacket 60. Advantageously, this chilled wall section of conduit 42 extends from a point about a foot upstream from the unit 48 to a point in the conduit where its interior surfaces are entirely wetted by the spray. A screen 61 is desirably interposed in the conduit 42 downstream of the spray unit 48 to aid in breaking up droplets of milk introduced into the air stream.

In further accord with the principles of the invention, the separator vessel 44 is provided with cooled or wetted surfaces which will be described more fully hereinafter. Fluid-introducing means 62 are arranged to cause a flow of fluid over the interior face of the surfaces of vessel 44 as will also be described hereinafter. In addition, the separator vessel 44 includes a stack or flue 64 which connects with a stack arrangement or scrubber 66, stack arrangement 66 being disposed above a factory roof section 68 to exhaust the scrubbed gases to the atmosphere.

Turning to FIG. 2 for a description of the structure of separator vessel 44, that unit is shown to comprise a generally cylindrical body portion 70 and an underlying, cone portion 72 which tapers downwardly to the sump 56. The body portion 70 is connected to conduit 42 to receive the flow of gases emanating from the dryer and primary separator, and the body portion 70 defines a generally annular chamber for receiving these gases by virtue of the flue 64 penetrating the separator vessel to a position at about the juncture of body portion 70 and cone portion 72. Conveniently, a body angle ring 74 surrounds the vessel 44 at this juncture to be used in making the corresponding mechanical connection. The concentric annular walls and interconnecting ceiling which define the chamber receiving the gases from conduit 42 include, in compliance with the present invention, surface means for collecting liquid from the gas stream; and for this purpose, these surface means are cooled or wetted or both. Turning for the moment to FIG. 4, the body portion 70 of separator vessel 44 structurally comprises an outer annular wall 76, a coaxial inner annular wall 78, and an interconnecting ceiling 80. Cooling water, supplied as will be described shortly, passes through a double-wall construction, in particular, downwardly between flue 64 and a surrounding annular wall 82 to rise between the wall 82 and wall 78, removing heat from the flue 64 and the wall 78 and establishing them as cooled surfaces. This water flows over the ceiling 80 and into an annular gutter 84 from whence it is discharged to a sewer or recycled in compliance with the parameters of the given installation.

In further accord with the features of the invention, means are provided for causing a continuous flow of liquid over the interior face of the cooled surfaces; and continuing with reference to FIG. 4, the fluid-introducing means 62 will be seen to comprise substantially concentric, annular header rings 86 and 88. The header ring 86 communicates with a suitable number of arcuately spaced spray or flow devices 90 by means of individual stub conduits 92, the devices 90 directing liquid across the interior surface of ceiling 80, down wall 76 and down the annular wall 78 from whence it is collected by an annular gutter 94. As is shown in FIG. 2, the gutter 94 is drained by a pipe 96 that is led through the wall of cone portion 72 to be connected with the sump 56. Returning to FIG. 4, a number of short sections of tubing 98 open into the header ring 88 at arcuate intervals, and the sections of tubing 98 are joined to upstanding sections of tubing 100 by means of pieces of flexible tubing 102. Thus, the header ring 88 cooperates with the devices 90 in supplying a flow of liquid onto an annular splash plate 104 which is inclined to direct a falling film of liquid downwardly over the wall 76 and over the interior surface or face of cone portion 72. The falling film of liquid that is directed over the interior surfaces of collector vessel 44 is intended to absorb the liquid milk introduced into the flowing gas stream and the dry particles of powder trapped with the introduced liquid. Accordingly, the liquid selected for wetting the interior surfaces of the collector vessel is advantageously selected to be compatible with milk; and practically therefore, this fluid is itself selected to be potable water, fresh cold milk or warmed milk introduced into the header rings, as is shown in FIG. 2, through an inlet line 106.

Considering again FIG. 4, a typical spray or flow device 90 includes a threaded stud 108 which is welded or otherwise suitably mounted to an interior surface of header ring 86 coaxially with one of the stub conduits 92. In addition, a flow-directing disc 110 is threadedly mounted on stud 108 in obstructing relationship relative to the orifice defined by the stub conduit 92, securing of the disc 110 being conveniently achieved by means of a nut 112 and a lock washer 114. When properly positioned by these latter means, the disc 110 directs the desired flow of water or milk over the surfaces as described.

Continuing now with reference to FIG. 2, the upper end of flue 64 is enclosed in a diploconical shell 116; and coolant is introduced into the lower section of this shell through a fitting 118 which opens through a cylindrical sidewall 120 below an annular, conical plate 122. An annular, conical floor 124 of downwardly tapering configuration cooperates with the plate 122 and the lower portion of sidewall 120 in defining a coolant chamber surrounding the upper midportion of flue 64; and with reference to FIG. 3, the conical floor 124 connects with the upper end of wall 82 spaced radially outwardly from the flue 64. Thus, cooling water entering the fitting 118 may flow downwardly between the flue 64 and the wall 82 for the purposes described hereinabove.

It is advantageous to provide inspection ports 126 between the shell 116 and the separator vessel 44. In order that these inspection ports may not obstruct the flow of coolant into the annular channel between flue 64 and wall 82, such ports are spaced arcuately as is suggested in FIG. 2. These ports may therefore comprise an annular wall 128 that is secured to both the flue 64 and the wall 82 by annular weldments or other suitable means, as is shown in FIG. 3. Completing the structure of a typical port 126 is a circular gasket 130 and a transparent plate 132 of glass or other suitable material.

In addition to serving as a source for the coolant water, diploconical shell 116 may, if desired, be arranged as a countercurrent, auxiliary scrubber or collector; and if it is desired to monitor the efficiency of separator 44, shell 116 may be arranged for recirculated flow of wash liquid to provide a means for obtaining such data. Referring again to FIG. 2, a suitable number of conventional entrainment separators or eliminator baffles shown schematically and indicated by the reference numeral 134 are mounted transversely of the axis of shell 116 by means of annular plates 136, plates 136 being provided with arcuately arranged drains 138. Wash liquid is supplied through an inlet 140 and distributed by means of a plurality of spaced spray devices 142. The conical plate 122 serves as the floor for the countercurrent collector, plate 122 delivering liquid to an outlet 144. In compliance with conventional practice, the entrainment separators 134 comprise alternate series of V-shaped and inverted V-shaped elements spaced to permit flow of the gas stream while, at the same time, establishing impingement surfaces for collecting any entrained particles.

For purposes of affording a more complete understanding of the invention, it is advantageous at this juncture to provide a functional description of the mode in which the component parts thus far identified operate. For purposes of the following descriptions, it is assumed that the dryer circuit 20 and the separator 36 are in operation. Thus, a stream of heated air under pressure is assumed to be passing through the conduit 42, such gas stream having a major portion of the milk powder previously removed from it.

A supply of milk will be continuously introduced into this gas stream by the spray unit 48, the milk supplied to the spray unit being warmed somewhat as for example to about 95°F. by the heater 50. The fine particles of milk powder in the air stream will come in contact with the atomized milk and pass into the upper section of separator vessel 44 with the gas stream. The wall 78 and ceiling 80 will be cooled by an external flow of water, as has been described with reference to FIG. 4; and a constantly downwardly moving thin film of milk will be passed over the surfaces of wall 78, ceiling 80 and wall 76, as well as the interior surface of cone section 72. Being directed into a vortex by the annular shape of body portion 70, the incoming gas stream will be cooled and the particles carried by this gas stream which are centrifuged into contact with the falling film of milk will be trapped and collected. By the arrangement of the present invention, all of the interior surfaces of the separator vessel 44 will be wet with the constantly moving film of milk to prevent adherence of milk solids and insure effective collection.

Cooperating in the prevention of solids builing up on the interior surfaces of the vessel 44 is the cooling provided by the water-chilled surfaces of wall 78 and ceiling 80. Moreover, the cooling of flue 64 serves to prevent solids from building up at that point in the equipment, moisture tending to condense at the cooled surfaces and wash the same or combine with a liquid film flowing thereover. It is to be recognized that the separator vessel 44 serves to arrest and capture fine particles in the dryer air stream regardless of whether these particles are milk solids escaping from cyclone separator 36, wet particles exiting from the precipitation chamber 28, or wet particles deliberately introduced by the spray unit 48. In addition, either whole milk powder or whey powder may be produced with equal facility. Valuable heat is also extracted from the dryer exhaust air by the milk being delivered to the evaporator 58; and whereas the apparatus of FIGS. 1–4 has been described using milk as the inlet product to spray unit 48, using water or milk as the inlet product to header rings 86 and 88, and using wash liquid (water) as the inlet fluid to spray devices 142, it is an important feature of the present invention that these inlet fluids may be replaced by caustic or other cleaning solutions for cleaning and sanitizing the interior of the equipment. Furthermore, the milk used to wet the interior of vessel 44 may make only a single pass through the equipment whereby to promote its use where a low heat exposure product is required.

Whereas stack losses from conventional dryer installations can be expected to range from 1 to 3 percent of the total solids processed, specific installations embodying collection apparatus in accord with the invention experience stack losses of about 0.3 and as low as 0.04 percent.

In situations wherein substantially complete removal of all solids from the exhaust air stream is desired, a final scrubber or stack eliminator is employed; and turning to FIG. 5, the scrubber 66 comprises an enclosure 146 which surrounds the exit end of a stack 148 above factory roof section 68. The stack 148 describes the outlet of shell 116 or, in cases where the shell 116 and its accompanying structure are not included in the installation, an extension of flue 64. The enclosure 146 includes an upright wall 150 which is spaced laterally from the stack 148 and a floor or bottom 152 which slopes to a drain 154, drain 154 connecting to a sewer or the like. Opposite sides of the upright wall 150 have gable extensions 156, and swingable cover panels 158 and 160 are mounted to close selectively the opening between the gable sections by means of hinges 162. The cover panels 158 and 160 are advantageously fabricated from corrosion and weather-resistant material such as stainless steel, and these cover panels are additionally power-driven into the closed position by means of a fluid-actuated jack 164.

In the illustrated embodiment, jack 164 comprises a piston 166 which is mounted on a piston rod 168, rod 168 being in turn connected to the pivot or cooperating links 170 and 172. The opposite ends of links 170 and 172 are swingably connected respectively to the cover panels 158 and 160, and a compression spring 174 is provided in the cylinder of jack 164 to bias the cover panels 158 and 160 into the open position. The jack 164 is operated by a manual control 176 located at a master panel, it being recognized that the manual control may be replaced by an automatic control if desired. Moreover, electrical or pneumatic interlock with the dryer circuit 20 may be provided by means of a position responsive switch 178, switch 178 operating, for example, to conditioning relay in the control circuitry for furnace 22. Thus, the open condition of the cover panels may be established as a condition precedent to the functioning of dryer circuit 20.

In compliance with the features of the present invention, the roof scrubber 66 includes an entrainment separator or eliminator baffle 180 inside the enclosure 146 and transverse the stack 148. Cooperatively, cool water is injected onto the top of baffle 180 by a series of spray devices 182 which are supplied from a conduit 184.

The objective of substantially complete scrubbing is furthered by means of a water spray 186 positioned below the roof scrubber 66 and in the flue 64 immediately above the cooled throat portion thereof, spray 186 being supplied with water under pressure from a line 188. For purposes of cleaning the interior of stack 148, an annular channel 190 is attached at the upper edge of the stack and is supplied with cleaning solutions from a pipe 192, such solutions flooding channel 190 to overflow into stack 148 wetting the interior surface thereof.

The roof scrubber 66 is, as described, employed when an extremely high degree of scrubbing is desired; and when the apparatus 66 is incorporated in an installation, its operation will proceed as follows. To initiate processing operations, the control 176 will be manipulated to withdraw actuating fluid from the cylinder of jack 164, releasing the piston 166 to the action of compression spring 174 for raising the cover panels 158 and 160. Upon cover panel 158 engaging the position responsive switch 178, the fan of the dryer furnace will be conditioned for operation and the process cycle started. Thereafter, the dryer exhaust gases will pass into the separator vessel 44 to exit in an ascending vortex through the flue 64. The swirling action of the exiting gas stream tends to impel entrained particles of milk solids against the interior walls of flue 64; and the droplets of water introduced into the gas stream by the spray 186 promote this centrifuging action while, at the same time, providing a falling film of dilute liquid on the interior of flue 64 whereby to return to the collector vessel 44 any solids carried over into the exiting gas stream. It is, of course, recognized that the velocity of the exiting gas stream should not be so great as to cause the liquid film on the walls of flue 64 to rise instead of fall.

Cooperatively, the droplets of water passing from the spray devices 182 provide a final washing of the exit gases while, at the same time, affording a washing and cooling action on the entrainment separator 180 whereby to avoid the possibility of milk solids building up on the surfaces of that element. Overflow from the entrainment separator 180 drops onto the floor of enclosure 150 to find its way to the sewer through drain 154.

When the processing cycle is completed and it is desired to clean the equipment, the control 176 will be manipulated to cause actuating fluid to flow into the jack 164 for closing the cover panels 158 and 160. Thereafter, caustic or other cleaning solution will be introduced through the spray devices 182 and through the channel 190. Cleaning solutions may also be introduced through the spray 186.

Whereas the separator vessel 44 and the collection apparatus of the invention in general have been thus far described as employing collection surfaces which are both wetted interiorly and chilled, the apparatus of the invention may be simplified so as to rely more extensively on wetting than chilling and so as actually to eliminate surfaces which are both chilled and wetted. Specifically, it is contemplated that header ring 88 and its associated parts may be omitted and that the cooling for flue 64, may also be omitted. In regard to the latter construction and with reference to FIG. 4, the gutter 84 would be eliminated together with the plate 124 of shell 116 and the multiple-walled construction of flue 64. Such an arrangement might additionally omit gutter 94 and drain pipe 96, the baffles 134, and the spray 142. Furthermore, the vessel 44 could, if desired, be arranged as a cylindrical unit rather than a unit comprising cylindrical and conical sections.

In such a modified arrangement, the flow devices 90 would deliver a flow of milk or water over the interior surfaces of vessel 44, and a falling film of water, as might be introduced by means of pipe 192 and channel 190, would be caused to wet the interior wall of stack 148 and flue 64. It will be appreciated that the described simplifications would be advantageous from the standpoint of reducing the cost of the equipment and promoting ease of its operation.

In order to enhance the understanding of the invention, a modified embodiment thereof is shown in FIG. 6. Since the embodiment of FIG. 6 is similar in some respects to the embodiment of FIG. 5, like numerals have been used to designate like parts with the suffix letters *a* being employed to distinguish those parts associated with the embodiment of FIG. 6.

The roof scrubber 66a is characterized by the provision of a single cover panel 194 which is secured to one or more brace arms 196, arms 196 being pivoted to arcuate brackets 198 by pins 200. An end section 202 of each brace arm extends beyond the bracket 198 to serve as one mounting for a fluid-actuated jack 204.

The other end of the jack 204 is pivoted to a mounting ear 206, and the jack itself is operated from a remotely disposed hand selector, not shown. In other respects the roof scrubber 66a is constructed and operates in a manner similar to the roof scrubber 66.

The specific embodiments herein shown and described are to be considered as being primarily illustrative. Various changes will, no doubt, occur to those skilled in the art; and such changes are to be understood as forming a part of this invention insofar as they fall within the spirit and scope of the appended claims.

We claim:

1. Apparatus for use in separating fine particles from a gaseous stream, said apparatus comprising: conduit means for carrying a stream of gas having particles mixed therein; vessel means including an outer annular wall portion connected to said conduit means for receiving said stream and presenting inwardly facing tubular surface means for collecting particles from said stream; wall means spaced inwardly from said outer annular wall portion and coaxial with said inwardly facing tubular surface means and including an ascending stack wall partially within said vessel means and an annular wall surrounding the lower portion of said stack wall and presenting outwardly facing tubular surface means spaced therefrom in confronting relationship with said inwardly facing tubular surface means, said conduit means entering the vessel above the lower end of said stack wall; ceiling means extending between the coaxially spaced tubular surface means and inclined downwardly and outwardly; means for directing coolant fluid between said stack wall and said annular wall whereby to establish said walls as cooled surfaces; fluid introducing means opening through the ceiling means for causing a flow of liquid over the inner surface of said ceiling means to the upper ends of both said tubular surface means and down the confronting faces thereof, whereby to prevent adherence of said particles to said surface means and insure effective collection of said particles and an interior splash plate inclined inwardly and downwardly from the outer edge of the ceiling means to the top of said inwardly facing tubular surface means.

2. Apparatus according to claim 1 in which the fluid introducing means includes outer fluid entry means directing fluid to said splash plate.

3. Apparatus according to claim 2 in which the fluid introducing means further includes disc means between the inner and outer edges of the ceiling means to spread the fluid over the inner surface of the ceiling means.

4. Apparatus according to claim 3 in which an annular coolant chamber is associated with the stack wall and the outwardly facing surface means and opens to the inner edge of the ceiling means to direct coolant fluid over the outer surface of the ceiling means.

* * * * *